No. 660,050. Patented Oct. 16, 1900.
L. E. COWEY.
APPARATUS FOR INDICATING VARIATIONS IN TERRESTRIAL GRAVITATION.
(Application filed Mar. 29, 1900.)
(No Model.) 2 Sheets—Sheet 1.
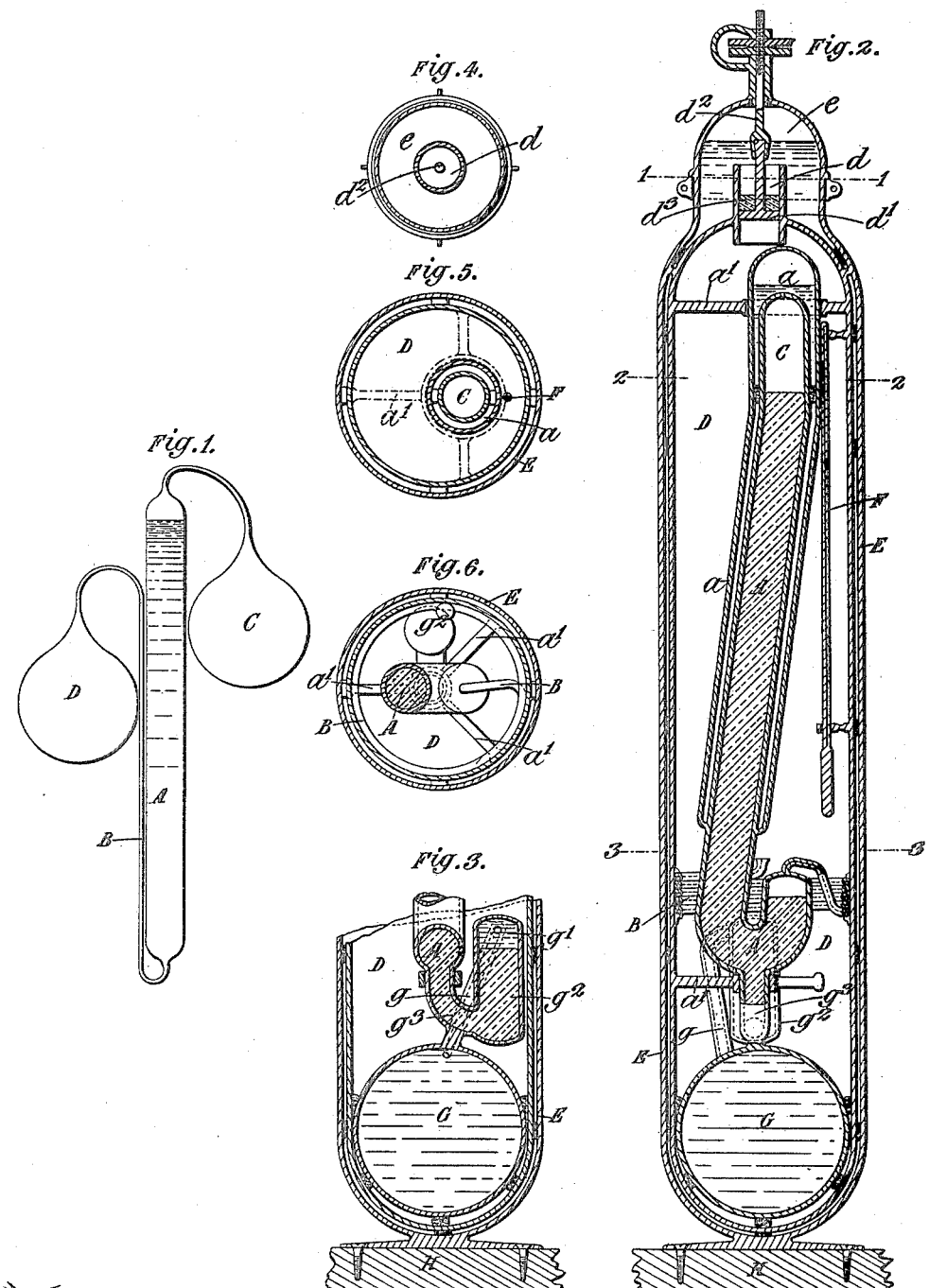

No. 660,050. Patented Oct. 16, 1900.
L. E. COWEY.
APPARATUS FOR INDICATING VARIATIONS IN TERRESTRIAL GRAVITATION.
(Application filed Mar. 29, 1900.)
(No Model.) 2 Sheets—Sheet 2.
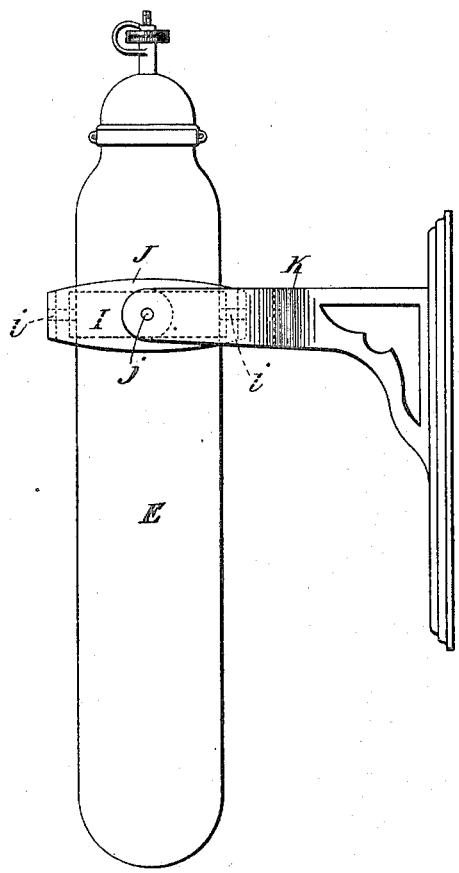
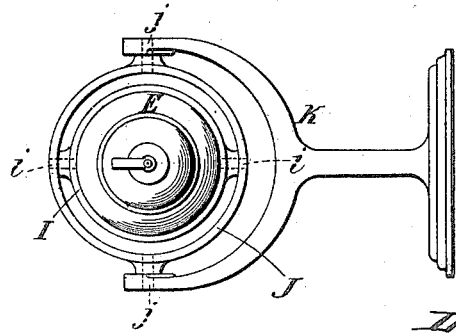

UNITED STATES PATENT OFFICE.

LEONARD EUGENE COWEY, OF LONDON, ENGLAND.

APPARATUS FOR INDICATING VARIATIONS IN TERRESTRIAL GRAVITATION.

SPECIFICATION forming part of Letters Patent No. 660,050, dated October 16, 1900.

Application filed March 29, 1900. Serial No. 10,657. (No model.)

*To all whom it may concern:*

Be it known that I, LEONARD EUGENE COWEY, engineer, a subject of the Queen of Great Britain, residing at 33 Holborn Viaduct, London, England, have invented certain new and useful Apparatus for Indicating the Variations in Terrestrial Gravitation, of which the following is a specification.

It is well known that the force of gravity, and consequently the weight of a body, varies in accordance with its distance from the earth's center and also with the latitude of the place where the observation is taken—that is to say, when a body passes from the equator toward the earth's poles, if it be kept at the sea-level its weight increases, because the distance from the earth's center diminishes as the poles are approached, and the action of centrifugal force becomes less.

It is the object of my invention to devise apparatus whereby the variations in the force of gravity can be indicated in a convenient manner and be utilized for ascertaining the latitude of places without reference to the sun or stars or for other purposes to which such indications can be applied.

An instrument constructed in accordance with my invention will enable the variations in the force of gravity at different places to be readily ascertained and the latitude or the altitude of such places to be obtained by a simple calculation.

According to my invention I employ a body of mercury or other appropriate liquid, which is so arranged as to be isolated or free from the influence of atmospheric pressure and, as far as possible, from variations in temperature. The mercury is contained in a vessel which communicates with a capillary or other small-bore tube opening into a closed chamber containing aeriform fluid. The upper end of said vessel is connected with or forms part of a chamber from which I prefer to remove the air, partly or wholly, so that said chamber is at low pressure or in a vacuous condition. The weight of the body of mercury will increase or diminish as the apparatus is shifted from one latitude to another at sea-level or is moved nearer to or farther from the earth's center without alteration in the latitude. As a consequence, the level of the body of mercury will fall or rise accordingly, whereby the mercury or an index in the capillary tube will change its position and indicate, with reference to graduations, the variation that has occurred.

The method of calculating the latitude from the indications of the instrument (which is the principal use to which the instrument would be applied) is effected in the following manner: Assuming that the instrument is carried on board a ship which is moving north from the equator, the weight of the body of mercury will vary practically only with the latitude, since the instrument will always be at sea-level or a few feet above it, and by means of the index in the capillary tube these variations will be distinctly represented. Assuming that the weight of the body of mercury were two hundred ounces at the equator, its weight would gradually increase until if it arrived at the north pole it would weigh about two hundred and one ounces. Thus if the weight of the mercury at any point should be 200.5 ounces the latitude at that place would be, roughly, 45° north, as this position would be half-way between the equator and the north pole. It will be evident that certain corrections in the indications of the instrument must be made for variations in sea-level due to the tides or otherwise and to the fact that the force of gravity at sea-level does not increase in an absolutely regular proportion as the poles are approached from the equator. These corrections will, however, be well understood and readily applied by navigators without requiring to be further described herein.

In order that my invention may be clearly understood and readily carried into practice, I will describe it more fully with reference to the accompanying drawings.

Figure 1 is a diagrammatic view showing a fundamental form of the apparatus. Fig. 2 is a central vertical section showing an advantageous form in which the apparatus may be constructed for general use. Fig. 3 is a central vertical section of the lower portion of the apparatus, taken at right angles to Fig. 2. Figs. 4, 5, and 6 are transverse sections taken, respectively, on the lines 1 1, 2 2, and 3 3 of Fig. 2. Figs. 7 and 8 are a side view and a plan, respectively, of a modification of my invention.

Like reference-letters indicate similar parts in all the figures.

A is the vessel containing the mercury, said vessel being tubular and arranged in a substantially-upright position.

B is the fine bore or capillary tube connected with the lower end of the vessel A, said end being in this case bent upward into a U shape.

C is the vacuum or low-pressure chamber communicating with the upper end of said tubular vessel A, and D is the chamber containing dry air or other aeriform fluid at a pressure depending upon the weight of the mercury and the pressure (when any exists) in the chamber C. The said aeriform fluid communicates with the lower end of the column of mercury through the said fine bore or capillary tube.

In Figs. 2 to 6 the chamber D, in addition to containing the aeriform fluid, serves also to inclose the tubular vessel A and the parts connected therewith. The capillary tube B is made in spiral form, so that it can be of considerable length without occupying much space. The vacuum-chamber C is located at the upper end of the tubular vessel A. The said chamber D is surrounded by another chamber E, containing liquid, which serves as a jacket for the chamber D. The upper end of said chamber E is provided with a head or dome $e$. The liquid-jacket effectually seals the chamber D and prevents the surrounding air from percolating its walls and entering the interior thereof. Even if air were to find its way through the outer casing of the jacketed chamber E it would not reach the chamber D, because it would rise in the liquid-jacket and so pass into the dome $e$. The greater portion of the tubular vessel A is likewise provided with a liquid-jacket by inclosing said vessel in a surrounding tube $a$, containing the liquid, so that any of the aeriform fluid in chamber D that may percolate through the wall of said surrounding tube can ascend into a space at the upper end of said surrounding tube, and thereby prevent such air reaching the interior of the vacuum-chamber C. The said tubular vessel A is supported in position by brackets $a'$ $a'$, situated within the chamber D. I provide means—such as a delicate thermometer F, contained within the said chamber D—for indicating any variations in the temperature thereof. I do not, however, confine myself to using only one thermometer, nor do I confine myself to the use thereof only in the aforesaid chamber D. Variations in the temperature of the said chamber D would of course alter the pressure of the contained aeriform fluid, and as a consequence the column of mercury would be elevated and the indications of the instrument rendered unreliable. In order to compensate for these variations in temperature and alterations of pressure and the consequent inaccurate indications, I provide within the chamber D a receptacle G, containing alcohol or similar liquid, such receptacle being connected by a tube $g$ to the upper part $g'$ of a small chamber $g^2$, communicating with the lower part of the tubular vessel A through a passage $g^3$. The mercury in the tubular vessel A thus has free access to the chamber $g^2$ and would fill the latter were it not for the fact that the upper part of said chamber $g^2$ is filled with the alcohol from the receptacle G. Therefore if the temperature of the aeriform fluid in chamber D should, for instance, rise, thereby increasing its pressure on the lower end of the mercury column and tending to cause the level of the said lower end to fall and alter the indication of the instrument, such rise of temperature would also cause the alcohol in the chamber $g^2$, the receptacle G, and the tube $g$ to expand, thereby forcing a certain quantity of the mercury from the chamber $g^2$ through the passage $g^3$ into the tubular vessel A. This operation, combined with the expansion of the mercury, increases the length of the column of mercury, and thereby counterbalances the pressure on the aeriform fluid in the chamber D, so that practically no movement of the lower end of the column of mercury or alteration in the instrument's indication will take place on account of the change of temperature. The aeriform fluid and the alcohol do not expand at exactly the same ratio at all temperatures. Therefore a slight correction must be made for temperature, as will be well understood.

As in practice it would not be possible to accurately proportion the different sizes of the chambers and vessels referred to and the quantities of the compensating liquid used, I provide the chamber D with means whereby its capacity, and consequently the pressure of the aeriform fluid which it contains, can be slightly diminished or increased after its manufacture. For this purpose the upper part of the said chamber D is formed with a cylindrical portion or extension $d$, into which fits a piston $d'$, that is capable of being shifted to and fro therein by an adjusting-screw $d^2$. By altering the position of the said piston I can slightly vary the capacity of the chamber D, as aforesaid. To prevent the liquid within the dome $e$ from finding its way between the cylinder and piston, I provide a small quantity of mercury or other suitable substance at $d$ to act as a packing.

Within the capillary tube B, I provide an index, of alcohol or other suitable substance, which will travel along said tube in one or other direction, according as the lower end of the column of mercury rises or falls by the variations in weight of the said column, as hereinbefore explained. The capillary tube is composed of glass, so that the movements of the index can be seen, and may be furnished with graduations so arranged as to be clearly visible through the walls of the chambers D and E, which are preferably also composed of glass; or, instead of graduating the capillary tube, I may employ a vernier placed contiguous to the said tube. The said graduations are preferably so arranged that they will extend from "0" to "90," which figures will represent, respectively, 0° and 90° of latitude. When the graduations are thus arranged, the index will directly indicate the latitude at sea-level of the place where the instrument may for the time being be situated.

H is a base to which the apparatus is connected at its lower end and by which it is maintained in a vertical position. It will be found advantageous to provide the instrument with a swinging mechanism as used in chronometers, so that it will keep a truly-vertical position when used at sea.

In Figs. 7 and 8 I have shown the instrument provided with such a swinging mechanism, wherein I is a ring firmly fixed around the vessel E and provided with trunnions $i$, fitting or engaging bearings formed in a second ring J. Said latter ring is similarly furnished with trunnions $j\,j$, arranged at right angles to the trunnions $i\,i$ and engaging or fitting in bearings formed in the arms of a bracket K, suitably or conveniently secured in position upon a wall so as to occupy an approximately horizontal position.

I do not wish to confine myself to the specific form of the apparatus hereinbefore described for explaining my invention, as any other form of the apparatus may be employed to suit the conditions under which it is to be used.

What I claim, and desire to secure by Letters Patent of the United States, is—

1. Apparatus of the character described, comprising a fixed vessel containing liquid isolated from atmospheric pressure, a vacuum or low-pressure chamber communicating with the upper-end portion of said vessel, an aeriform-fluid chamber communicating with the lower-end portion of said vessel, a fine-bore index-tube, through which the aeriform fluid within the said chamber exerts its pressure to support the liquid in the aforesaid vessel and a liquid index in said tube, the said tube serving to amplify the indications of the movement of the liquid resulting from variations in the weight of the latter, substantially as and for the purpose set forth.

2. Apparatus of the character described comprising, an upright fixed tubular vessel containing liquid isolated from atmospheric pressure said vessel having at the upper end a space constituting a vacuum or low-pressure chamber, an aeriform-fluid chamber inclosing the said tubular vessel, a fine-bore index-tube located within the said aeriform-fluid chamber and through which the aeriform fluid within the said chamber exerts its pressure to support the liquid in the aforesaid vessel, and a liquid index contained in said tube, between the fluid in the aeriform-fluid chamber and the liquid in the vessel, substantially as and for the purpose set forth.

3. Apparatus of the character described comprising an upright fixed tubular vessel containing liquid isolated from atmospheric pressure and having its lower end formed with an upturned leg and also having at its upper end a space constituting a vacuum or low-pressure chamber, a fluid-jacket surrounding the greater portion of said tubular vessel, a sealed chamber containing aeriform fluid and inclosing the said tubular vessel and its surrounding jacket, a fluid-jacket surrounding the aeriform-fluid chamber, and a graduated capillary tube containing an index, said capillary tube being spirally disposed within said aeriform-fluid chamber and communicating with the latter and with the upturned leg of the tubular vessel, substantially as and for the purpose set forth.

4. Apparatus of the character described comprising the upright fixed tubular vessel, the vacuum or low-pressure chamber, the aeriform-fluid chamber and the fine-bore index-tube, and its index in combination with means for compensating for the variations in the pressure of the aeriform fluid on the liquid in the tubular vessel, due to variations in temperature.

5. Apparatus of the character described comprising the upright fixed tubular vessel, the vacuum or low-pressure chamber, the aeriform-fluid chamber and the fine-bore index-tube and its index, in combination with a small chamber communicating with the lower part of said tubular vessel so that the liquid in the latter vessel can have access to the said chamber, and of a receptacle from which fluid is supplied to the upper part of said small chamber, substantially as described and for the purpose set forth.

6. Apparatus of the character described, comprising the upright fixed tubular vessel containing liquid, the vacuum or low-pressure chamber, the aeriform-fluid chamber, and the fine-bore index-tube and its index, in combination with means for varying the capacity of said aeriform-fluid chamber for the purpose set forth.

7. Apparatus of the character described comprising the upright fixed tubular vessel containing liquid, the vacuum or low-pressure chamber, the aeriform-fluid chamber and the fine-bore index-tube and its index, in combination with a cylindrical extension on said aeriform-fluid chamber, of a piston in said cylindrical extension and of means for adjusting from the exterior of the apparatus the position of said piston, substantially as and for the purpose described.

In testimony whereof I have hereunto set my hand, in presence of two subscribing witnesses, this 16th day of March, 1900.

LEONARD EUGENE COWEY.

Witnesses:
F. J. SHERRINGTON,
JOSEPH LALLE.